Aug. 6, 1968 R. W. PETERS 3,396,290
CONCENTRIC STATOR WINDINGS AND METHOD OF WINDING
Filed Oct. 20, 1965

INVENTOR
ROBERT W. PETERS

Wheler, Wheler & Wheeler
ATTORNEYS 3,396,290
CONCENTRIC STATOR WINDINGS AND
METHOD OF WINDING
Robert W. Peters, Menomonee Falls, Wis., assignor to
Henry J. Gorski, Milwaukee, Wis.
Filed Oct. 20, 1965, Ser. No. 498,633
8 Claims. (Cl. 310—180)

The invention relates generally to stator windings. More particularly, the invention relates to concentric pole windings and to methods of winding such pole windings.

The invention is directed to obtaining greater economy in the winding of stators and, at the same time, obtaining improved electrical characteristics. In particular, the invention is directed to reducing the amount of copper contained in a pole winding of two or more concentric coils by decreasing the axial extent of the coils from the stator faces and without reducing the amount of copper in the coil slots. Such reduction in the amount of copper results in improved electrical characteristics. In accordance with the invention, such decrease in the amount of axial width or length of the wound stator is achieved by winding the coils in two or more generally concentric layers, each layer extending axially outwardly from adjacent to the adjacent end face of the stator.

The invention provides a coil winding including two or more concentric coils which have respective span portions of successively increasing length and which are arranged so that the coil or coils having the larger span portions are located in a coil layer extending axially from the adjacent stator face and generally circumferentially about the stator axis and so that the coil or coils having the smaller span portions are located in another coil layer extending axially from adjacent to the adjacent stator face radially inwardly of the first coil layer. If desired, the coils could be separated into more than two layers depending upon the number of coils involved.

The invention also provides a stator winding method wherein there is initially wound a first coil having a span portion extending arcuately about the axis of the stator, and arranged in axially extending relation from the adjacent end face of the stator. Subsequently, another or second coil of less arcuate span is wound with its span portion located in axially extending relation from the adjacent stator face and radially inwardly of the span portion of the first coil. If desired, additional coils having larger spans than the first coil can be wound concentrically with the first coil in the radially outer coil layer and additional coils having larger spans than the second coil but less than the first coil can be wound concentrically with the second coil in the radially inner coil layer. It is contemplated that all of the coils in the coil group or pole winding can be wound from a single unbroken wire.

Other objects and advantages of the invention will become known by reference to the following description and the accompanying drawings in which.

Figure 1:
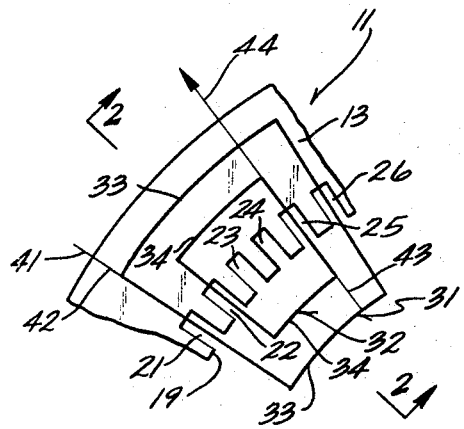
FIGURE 1 is a fragmentary schematic view of a first pole winding embodying various of the features of the invention.
Figure 2:
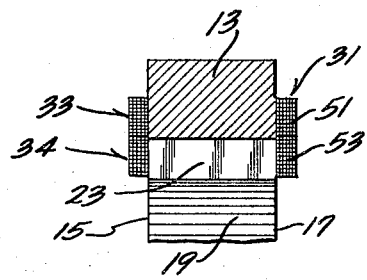
FIGURE 2 is a fragmentary sectional view taken along line 2—2 of FIGURE 1.

In FIGURES 1 and 2, there is schematically shown a pole winding or coil group 11 on a fragmentarily shown stator 13. The stator is conventionally constructed to include a pair of opposed end faces 15 and 17, and a central internal bore 19 which extends between the end faces 15 and 17 and which communicates with a plurality of slots extending radially outwardly from the bore, slots 21 through 26 being shown in FIGURE 1.

In FIGURE 1, the pole winding 11 comprises a pair of concentric outer and inner coils 31 and 32, which coils are located in respective pairs of slots 21 and 26 and 22 and 25, and which have respective span portions 33 and 34, span portions 33 being of greater arcuate length than span portions 34.

In accordance with the invention, the coil winding 31 is provided by initially laying a wire 41 to provide a tap 42 and then by laying the wire 41 through the slot 21 from the face 15, then arcuately along the face 17 to the slot 26 to provide a first span portion, then through the slot 26 in the other direction back to the stator face 15, and then arcuately along the stator face 15 to the slot 21 to provide another span portion, whereby a first turn is completed. The coil 31 can be provided with as many turns as desired. The span portions of such turns are laid one upon the other to form an outer coil layer 51 extending axially from the adjacent stator faces and arcuately about the stator axis.

When the coil 31 is provided with the desired number of turns, the wire 41 is laid with a lead portion 43 extending along the face 17 to the slot 25, then through the slot 25 to the stator face 15, then arcuately along the stator face 15 radially inwardly of the coil layer 51 to the slot 22 to provide a span portion, then through the slot 22 to the stator face 17, and then arcuately along the stator face 17 and radially inwardly of the first coil layer 51 to the slot 25 to provide a span portion and to complete the first turn of the coil 32. As many turns as desired can be included in the coil 32 and the span portions of such turns are laid one upon another to form another coil layer 53 extending axially from adjacent to the adjacent stator faces and arcuately about the stator axis radially inwardly of the outer layer 51. When the coil 32 is provided with the desired number of turns, the wire 41 extending from the slot 25 is arranged to provide a lead tap 44 and can be cut or can be employed to commence the winding of another group of coils.

The winding arrangement 11 shortens the axial extent of the coil 31 by locating the coil 31 in a radially outwardly located coil layer 51 extending from adjacent to the coil faces rather than in partially axially outward overlying relation to the span portions of the coil 32 having span portions of lesser arcuate length.

Figure 3:
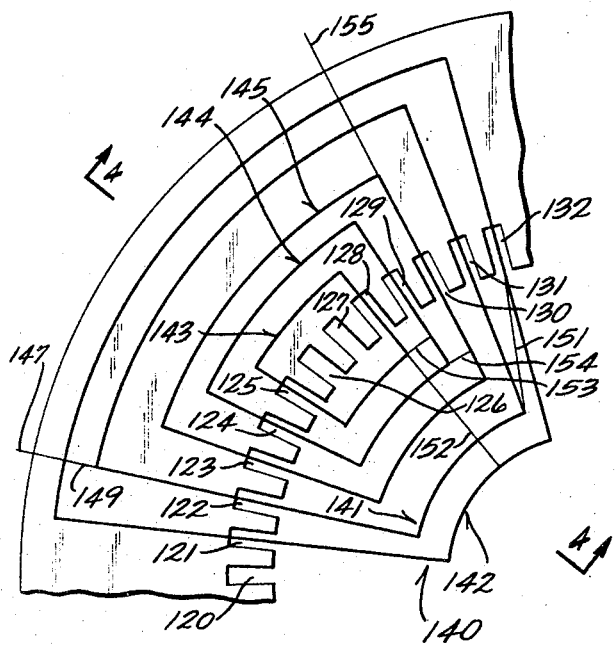
FIGURE 3 is a fragmentary schematic view of a first pole winding of another embodiment of the features of the invention.
Figure 4:
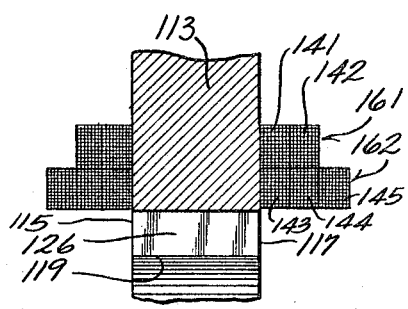
FIGURE 4 is a schematic sectional view taken generally along line 4—4 of FIGURE 3.

Shown in FIGURES 3 and 4 is another embodiment of the invention which includes a stator 113 having a pair of opposed end faces 115 and 117, a central bore 119, and a plurality of coil slots 120 through 132, together with a coil group or pole winding 140 which comprises five coils, 141, 142, 143, 144, and 145. In accordance with the invention, a wire 147 is first laid with a tap 149 and is then laid through slot 122 to the face 117, then arcuately along the stator face 117 outwardly of the outer ends of the slots to the slot 131, then through the slot 131 to the stator face 115, and then arcuately along the stator face 115 outwardly of the ends of the slots to form a first turn of the coil 141. As many turns as desired can be included in the coil 141. The span portion of such turns are laid upon one another to start the formation of the first or outer coil layer 161 extending axially from the adjacent faces of the stator arcuately about the stator axis.

When the coil 141 is provided with the desired number of turns, the second coil 142 having a greater arcuate span than the first coil is provided. More specifically, the wire 147 extending along the stator face 117 in the last turn of the coil 141 is laid with a portion 151 extending to the slot 132. Subsequently, the wire 151 is laid through the slot 132 to the stator face 115, then arcuately about the stator axis upon the span portions of the first coil 141 to the slot 121, through the slot 121 to the stator face 117, and then arcuately around the stator axis upon the span portions of the first coil 141, thereby completing a first turn. As many turns as are desired can be included in the coil 142, with the span portions of each turn being laid one upon each other and upon the span portions of the first coil 141 to extend the first coil layer 161 axially outwardly from the stator faces. Additional concentric coils, each having respective larger arcuate spans can be included in the outer coil layer 161 as desired.

When the outer coil layer 161 is completed, a second or inner coil layer 162 is then wound. In the specifically disclosed construction, the wire 147 extening along the stator face 117 is laid with a portion 152 extending from the coil 142 to the slot 128, then through the slot 128 to the stator face 115, then arcuately along the stator face 115 radially ouwardly of the ends of the stator slots and inwardly of the first coil layer 161 to the slot 125, then through the slot 125 to the stator face 117 and then arcuately along the stator face radially outwardly of the ends of the stator slots and radially inwardly of the first coil layer 161 to the slot 128 to complete the first turn of the coil 143 and to start the second coil layer 162 in radially inward relation to the coil layer 161. As many turns as may be desired may be provided in the coil 143.

When the desired number of coils have been provided in the coil 143, the wire 147 extending along the face 117 is laid with a portion 153 extending to the slot 129, then through the slot 129 to the stator face 115, then arcuately along the stator face 115 radially outwardly of the stator slots and upon the turns of the coil 143 and inwardly of the first coil layer 161 to the slot 124, then through the slot 124 to the stator face 117, and then along the stator face 117 upon the turns of the coil 143 and inwardly of the first coil layer 161 and radially outwardly of the stator slots to the slot 129, to provide a first turn of the coil 144 which has a greater arcuate span than the coil 143. As many turns as desired may be included in the coil 144. After the desired number of coils has been provided in the coil 144, the wire 147 extending along the face 117 is laid with a portion 154 extending to the slot 130, then through the slot 130 to the stator face 115, then arcuately along the stator face 115 radially outwardly of the stator slots and upon the turns of the coil 144 and radially inwardly of the first coil layer 161 to the slot 123, then through the slot 123 to the stator face 117, and then along the stator face 117 upon the turns of the coil 144 and inwardly of the first coil layer 161 and radially outwardly of the stator slots to the slot 129, to provide a first turn of the coil 145 which has a greater arcuate span than the coil 144 but less than the arcuate span of the coil 141. As many turns as desired can be included in the coil 145. When the desired number of coils have been provided in the coil 145, the wire 147 extending from the slot 130 can be cut with a portion providing a tap 155.

While the first coil layer 161 has been described as including two coils 141 and 142, and while the second coil layer 162 has been disclosed as including three coils 143, 144, and 145, the first and second coil layers can contain any desired number of coils.

Various of the features of the invention are set forth in the following claims.

What is claimed is:

1. A stator winding comprising first and second concentrically arranged coils having span portions of respectively greater and lesser arcuate length, said span portion of said first coil being generally at a first radial distance from the axis of the stator, and said span portion of said second coil being located at a second radial distance from the axis of the stator less than said first radial distance.

2. A winding located in a series of inwardly open slots in a stator, said winding comprising a series of concentric coils of progressively greater span, said coils of larger span being located in a first coil layer and said coils of lesser span being located in a second coil layer located at a lesser radial distance from the axis of the stator than said coils in said first coil layer.

3. A stator winding comprising a series of at least four concentric coils having respective span portions of successively increased arcuate length, said coils with said span portions of larger length being generally located at a first radial distance from the axis of the stator in a first coil layer and coils with said span portions of lesser length being generally located at a second radial distance from the axis of the stator less than said first radial distance and in a second coil layer, said first and second coil layers extending axially of said stator from adjacent to the adjacent faces of the stator.

4. A winding in accordance with claim 3 wherein said series of coils are formed by a single unbroken wire.

5. A method of winding a stator or the like with a series of coils arranged in concentric relation and with successively increasing arcuate spans, said method comprising the steps of initially winding a first coil having a span of given arcuate length in a first coil layer located generally at a first radial distance from the axis of the stator, and subsequently winding a second coil of lesser span in a second coil layer located at a second distance from the axis of the stator less than said first distance.

6. A method in accordance with claim 5 wherein said winding of each of the first and second coils initially takes place in adjacent relation to the faces of the stator.

7. A method of winding a stator or the like with a series of coils arranged in concentric relation and with successively increasing arcuate spans, said method comprising the steps of initially winding a first coil having a span of given arcuate length in a first coil layer located generally at a first radial distance from the axis of the stator, subsequently winding a second coil having an arcuate span greater than said first coil in concentric relation to said first coil in said first coil layer, subsequently winding a third coil having an arcuate span less than said first coil in concentric relation to said first and second coils and in a second coil layer located at a second distance from the axis of the stator less than said first distance, and subsequently winding a fourth coil having an arcuate span greater than said third coil and less than said first coil in concentric relation to said first, second, and third coils and in said second coil layer.

8. A method in accordance with claim 7 wherein the first, second, third, and fourth coils are wound from an unbroken wire.

References Cited

UNITED STATES PATENTS

| | | | |
|---|---|---|---|
| 1,488,873 | 4/1924 | Francis | 310—180 |
| 3,030,534 | 4/1962 | Hammerstrom et al. | 310—185 |
| 3,333,330 | 8/1967 | Linkous | 29—596 |
| 3,348,084 | 10/1967 | Jordan | 310—202 |

MILTON O. HIRSHFIELD, *Primary Examiner.*

WARREN E. RAY, *Examiner.*